US009171647B2

(12) United States Patent
Ryu et al.

(10) Patent No.: US 9,171,647 B2
(45) Date of Patent: Oct. 27, 2015

(54) SPACER GRID FOR NUCLEAR FUEL ASSEMBLY FOR REDUCING FLOW-INDUCED VIBRATION

(71) Applicant: KEPCO NUCLEAR FUEL CO., LTD., Daejeon (KR)

(72) Inventors: Joo Young Ryu, Daejeon (KR); Jung Min Suh, Daejeon (KR); Sang Youn Jeon, Daejeon (KR); Kyong Bo Eom, Daejeon (KR); Joon Kyoo Park, Daejeon (KR); Dong Geun Ha, Daejeon (KR); Jin Sun Kim, Daejeon (KR); Seong Soo Kim, Daejeon (KR); Oh Joon Kwon, Seoul (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 181 days.

(21) Appl. No.: 13/648,312

(22) Filed: Oct. 10, 2012

(65) Prior Publication Data
US 2014/0037040 A1 Feb. 6, 2014

(30) Foreign Application Priority Data
Aug. 6, 2012 (KR) ........................ 10-2012-0085973

(51) Int. Cl.
*G21C 3/34* (2006.01)
*G21C 3/356* (2006.01)
*G21C 3/322* (2006.01)

(52) U.S. Cl.
CPC ................ *G21C 3/356* (2013.01); *G21C 3/322* (2013.01); *G21C 3/3563* (2013.01); *G21C 2003/3432* (2013.01); *Y02E 30/38* (2013.01)

(58) Field of Classification Search
CPC .... G21C 3/356; G21C 3/3563; G21C 3/3566; G21C 3/34; G21C 3/3408; G21C 3/3416; G21C 3/352; C21C 2003/3432

USPC ......................................................... 376/442
See application file for complete search history.

(56) References Cited

U.S. PATENT DOCUMENTS 3,715,275 A * 2/1973 Krawiec .................... 376/442
4,081,324 A * 3/1978 Flora et al. ................ 376/441
(Continued)

FOREIGN PATENT DOCUMENTS

CN 101770820 A 7/2010
FR 2 766 003 1/1999
(Continued)

OTHER PUBLICATIONS

Joo Young Ryu et al., "An Analysis on the Flow Induced Vibration Characteristics of Protective Grids in Nuclear Fuel Assembly", The Korean Society for Noise and Vibration Engineering, 2012, Spring Conference Proceedings, pp. 739-740.
France Office Action issued Dec. 18, 2014.

*Primary Examiner* — Jack W Keith
*Assistant Examiner* — Sharon M Davis
(74) *Attorney, Agent, or Firm* — Rabin & Berdo, P.C.

(57) ABSTRACT

Disclosed herein is a spacer grid for a nuclear fuel assembly. The spacer grid has dimples for supporting fuel rods and is formed from grid strips which are assembled in a lattice shape to form lattice cells. Each grid strip has at least one hole which is formed separately from the dimples. Therefore, when coolant is drawn into the fuel assembly, a pressure difference between opposite sides of the holes is reduced, and friction generated between cut edges of the holes and the coolant reduces the magnitude of the vibration and causes a damping effect, thus reducing flow-induced vibration. The hole formed in the grid strip function to widen the range of the frequency of the flow-induced vibration caused by vortex sheddings formed around the edges of the grid strip, thus reducing the possibility of the generation of resonance with the natural frequency of the spacer grid.

2 Claims, 5 Drawing Sheets

(56) References Cited

U.S. PATENT DOCUMENTS

| | | | |
|---|---|---|---|
| 4,265,708 A * | 5/1981 | Lawrence | 376/352 |
| 4,585,615 A * | 4/1986 | DeMario | 376/442 |
| 5,158,162 A * | 10/1992 | Fink et al. | 188/378 |
| 5,167,911 A * | 12/1992 | Fujimura et al. | 376/440 |
| 5,371,769 A * | 12/1994 | Kato et al. | 376/442 |
| 6,421,407 B1 * | 7/2002 | Kang et al. | 376/439 |
| 6,542,567 B1 | 4/2003 | Mayet et al. | |
| 7,940,883 B1 * | 5/2011 | Koga et al. | 376/438 |
| 2010/0098208 A1 | 4/2010 | Eom et al. | |
| 2010/0128835 A1 * | 5/2010 | Yoon et al. | 376/426 |
| 2010/0310034 A1 * | 12/2010 | Jiang et al. | 376/442 |

FOREIGN PATENT DOCUMENTS

| | | |
|---|---|---|
| FR | 2 920 856 | 3/2009 |
| KR | 10-0898114 B1 | 5/2009 |
| KR | 10-0907634 B1 | 7/2009 |
| KR | 10-0907635 B1 | 7/2009 |
| KR | 10-0918486 B1 | 9/2009 |
| KR | 10-0927133 B1 | 11/2009 |
| KR | 10-2010-0076462 A | 7/2010 |
| KR | 10-0982302 B1 | 9/2010 |
| WO | WO 99/03108 | 1/1999 |

\* cited by examiner

SPACER GRID FOR NUCLEAR FUEL ASSEMBLY FOR REDUCING FLOW-INDUCED VIBRATION

BACKGROUND OF THE INVENTION

1. Field of the Invention

The present invention relates generally to spacer grids for nuclear fuel assemblies for reducing flow-induced vibrations and, more particularly, to a spacer grid for a nuclear fuel assembly which is formed from grid strips of an improved structure, thus reducing flow-induced vibration.

2. Description of the Related Art

A nuclear reactor refers to a device that is designed to exert artificial control over the chain reaction of the nuclear fission of fissile materials and use thermal energy generated from the nuclear fission as power.

Generally, nuclear fuel that is used in a nuclear reactor is formed in such a way that enriched uranium is molded into a cylindrical pellet of a predetermined size and many pellets are inserted into fuel rods. The fuel rods constitute a nuclear fuel assembly. The nuclear fuel assembly is loaded in a core of the nuclear reactor before it is burned up in a nuclear reaction.

Referring to FIG. 1, a typical nuclear fuel assembly includes a plurality of fuel rods 10 which are located in an axial direction, a plurality of spacer grids 20 which are provided in a transverse direction of the fuel rods 10 and support the fuel rods 10, a plurality of guide thimbles 30 which are fixed to the spacer grid 20 and form a framework of the assembly, and a top nozzle 40 and a bottom nozzle 50 which respectively support upper and lower ends of the guide thimbles 30.

About 200 or more fuel rods 10 are used to form the nuclear fuel assembly. Enriched uranium is molded into a pellet of a predetermined size and installed in each fuel rod 10.

The top nozzle 40 and the bottom nozzle 50 support the upper and lower ends of the guide thimbles 30. The top nozzle 40 is provided with elastic bodies to push down an upper end of the nuclear fuel assembly, thus preventing the pressure of a coolant flowing from a lower end of the nuclear fuel assembly towards the upper end thereof from lifting up the nuclear fuel assembly. The bottom nozzle 50 supports the lower ends of the guide thimbles 30. A plurality of flow holes through which the coolant is supplied into the nuclear fuel assembly are formed in the bottom nozzle 50.

The several spacer grids 20 are arranged at predetermined intervals with respect to the axial direction of the fuel rods 10. According to the arrangement location and function, the spacer grids 20 are classified into medial spacer grids, mixing spacer grids which enhance the performance of mixing the coolant, and a protective spacer grid which filters out foreign substances.

Referring to FIG. 2, the spacer grids are commonly formed by a plurality of grid strips assembled in a lattice shape. In each spacer grid, a single fuel rod or guide thimble is disposed in each of the lattice cells.

In detail, the spacer grid 20 includes a plurality of an outer grid strip 21 which forms an outer frame of a structure, and horizontal grid strips 22 and vertical grid strips 23 which are arranged and fixed inside the outer grid strip 21 and form a lattice shape.

The fuel rods are disposed in the corresponding lattice cells 20a formed in the spacer grid 20 having the above-mentioned construction. Further, guide thimble lattice cells 20b into which the guide thimbles are inserted are formed in the spacer grid 20.

The fuel rods are assembled with the spacer grid in such a way that dimples and springs are provided on the grid strips that form the lattice cells so that the grid strips elastically support the fuel rods. Each guide thimble may be welded to the spacer grid or may be mechanically fixed thereto by a sleeve.

Meanwhile, during a process of supplying a coolant into the flow hole of the bottom nozzle 50, foreign substances, for example, pieces of metal, chips or shavings which are created when cooling equipment or piping equipment is produced, installed or repaired, may enter, along with the coolant, through the flow hole of the bottom nozzle 50.

If such foreign substances enter the assembly along with the coolant, they may damage the jacket tubes. Therefore, foreign substances along with the coolant must be prevented from entering the nuclear fuel assembly.

Among the spacer grids, the protective spacer grid that is disposed adjacent to the bottom nozzle 50 functions not only to support the fuel rods but also to filter out foreign substances which may be drawn, along with the coolant, into a nuclear reactor during the process of circulating the coolant. The protective spacer grid is also named a filtering spacer grid.

For instance, protective spacer grids were proposed in Korean Patent Registration No. 10-0898114 (date: May 11, 2009), No. 10-0918486 (date: Sep. 15, 2009), No. 10-0907634 (date: Jul. 7, 2009), No. 10-0907635 (date: Jul. 7, 2009), No. 10-0982302 (date: Sep. 8, 2010), No. 10-0927133 (date: Nov. 10, 2009) which are filed by the applicant of the present invention.

The conventional protective spacer grids are provided with filtering parts which protrude from surfaces of grid strips in bent shapes so as to filter out foreign substances from a spacer grid. In particular, the purpose of the conventional protective spacer grids is not only to improve the performance of filtering out foreign substances that pass through a flow hole of a bottom nozzle but also to minimize a pressure drop that is caused by a reduction in the cross-sectional area of the flow hole.

FIG. 3 is a perspective view illustrating a protective spacer grid according to a conventional technique. Only one of lattice cells formed from a plurality of grid strips is shown in this drawing.

Referring to FIG. 3, the conventional spacer grid 60 includes dimples 62 which are formed in the grid strips 61 to support a corresponding fuel rod, and filtering parts 63 which bend and protrude in arc-shapes so as to filter out foreign substances. A separate spring may be provided to elastically support the fuel rod, although it is not shown in the drawing.

To more reliably prevent foreign substances from entering the fuel assembly, the shape of each filtering part 63 of the protective spacer grid may be complicated, or the cross-sectional area of the filtering part 63 may be widened, thus reducing the size of the space so that foreign substances cannot pass it. However, because pressure drop of the coolant is proportional to the cross-sectional area of the spacer grid when seen in the axial direction, the shape of the filtering parts cannot be designed just to be complex, even though the complex design can enhance the performance of filtering out foreign substances.

As such, the shape and structure of the filtering parts or the dimples of the protective spacer grid are susceptible to pressure drop of a coolant. Thereby, flow-induced vibration may be caused by the coolant that is drawn into the fuel assembly at high speed.

When the natural frequency of the protective spacer grid and the frequency of flow-induced vibration attributable to turbulence formed around the edges of the grid strips of the protective spacer grid are within the same range, the protective spacer grid is subject to large vibrations because of resonance. If the protective spacer grid undergoes large vibrations for a long period of time, fatigue damage or rupture occurs, acting as a mechanism of damaging the nuclear fuel assembly.

Hence, the spacer grids, in particular, the protective spacer grid which is disposed adjacent to the bottom nozzle, must be designed to reduce flow-induced vibrations.

SUMMARY OF THE INVENTION

Accordingly, the present invention has been made keeping in mind the above problems occurring in the prior art, and an object of the present invention is to provide a spacer grid for a nuclear fuel assembly which is formed from grid strips of an improved structure, thus reducing flow-induced vibrations.

In order to accomplish the above object, the present invention provides a spacer grid provided in a lower end of a nuclear fuel assembly and having a dimple for supporting a fuel rod, the spacer grid including a plurality of grid strips assembled in a lattice shape to form lattice cells, each of the grid strips having at least one hole formed separately from the dimple.

The hole may be formed in a planar surface of each of the grid strips above or below the dimple.

Each of the grid strips may include a filtering part formed by slitting a portion of a surface of the grid strip, the filtering part perpendicularly protruding from the surface of the grid strip to filter out foreign substances. Preferably, the hole may be formed in the planar surface of the grid strip above the dimple, or between the dimple and the filtering part, or below the filtering part.

The hole may comprise two or more holes formed in a surface of the grid strip and arranged with respect to a horizontal direction. More preferably, each of the holes may be circular or elliptical.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The invention now will be described more fully hereinafter with reference to the accompanying drawings, in which various embodiments are shown. Specific structures or a functional description described in the embodiments are given only to explain the embodiments according to the concept of the present invention. This invention may be embodied in many different forms, and should not be construed as being limited to the embodiments set forth herein. All possible modifications, additions and substitutions must be considered as falling within the scope and spirit of the invention.

It will be understood that, although the terms first, second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. On the other hand, it should be understood that when an element is referred to as being "directly coupled" or "directly connected" to another element, there are no intervening elements present. Other expressions for describing a relationship between elements, e.g. "between" and "directly between" or "adjacent to" and "directly adjacent to", must also be construed in the same way.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, a preferred embodiment of the present invention will be explained in detail with reference to the attached drawings. For reference, although a protective spacer grid having a separate filtering part for filtering out foreign substances will be explained in this embodiment, the present invention is not limited to this embodiment. For example, the present invention may be applied to a general spacer grid of a nuclear fuel assembly in the same way.

Figure 1:
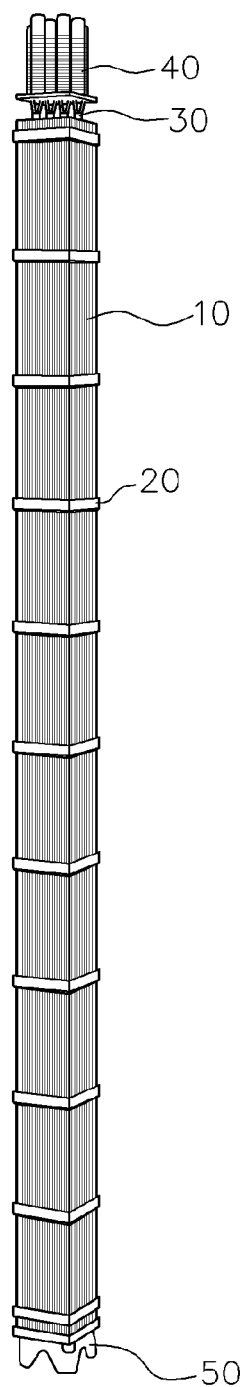
FIG. 1 is a view illustrating a typical nuclear fuel assembly.
Figure 2:
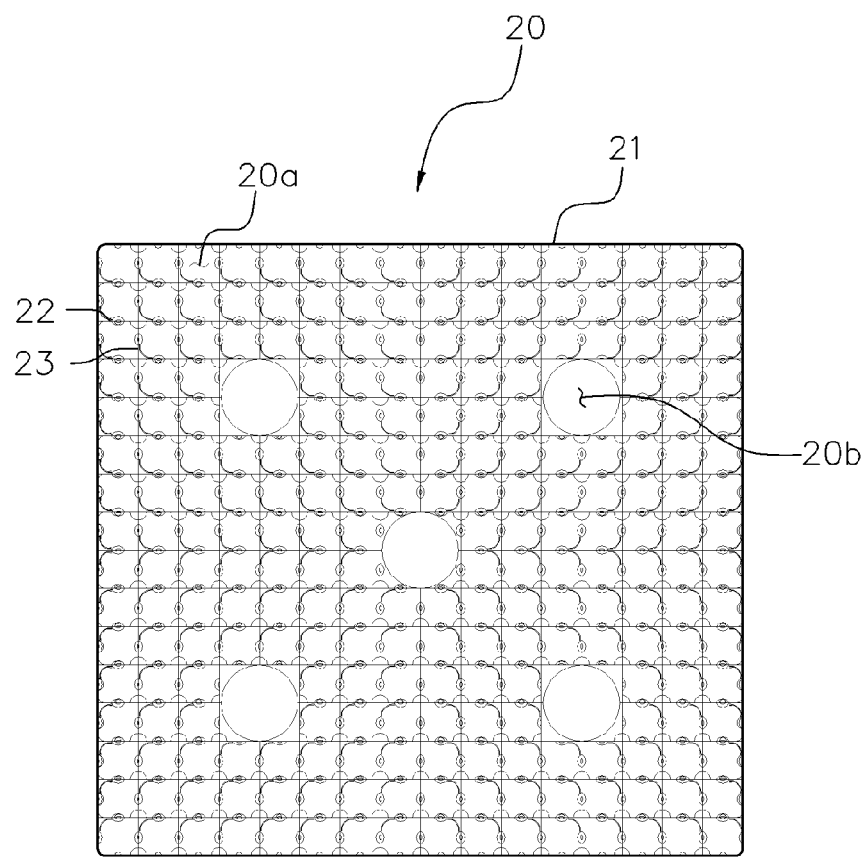
FIG. 2 is a plan view of a typical spacer grid.
Figure 3:
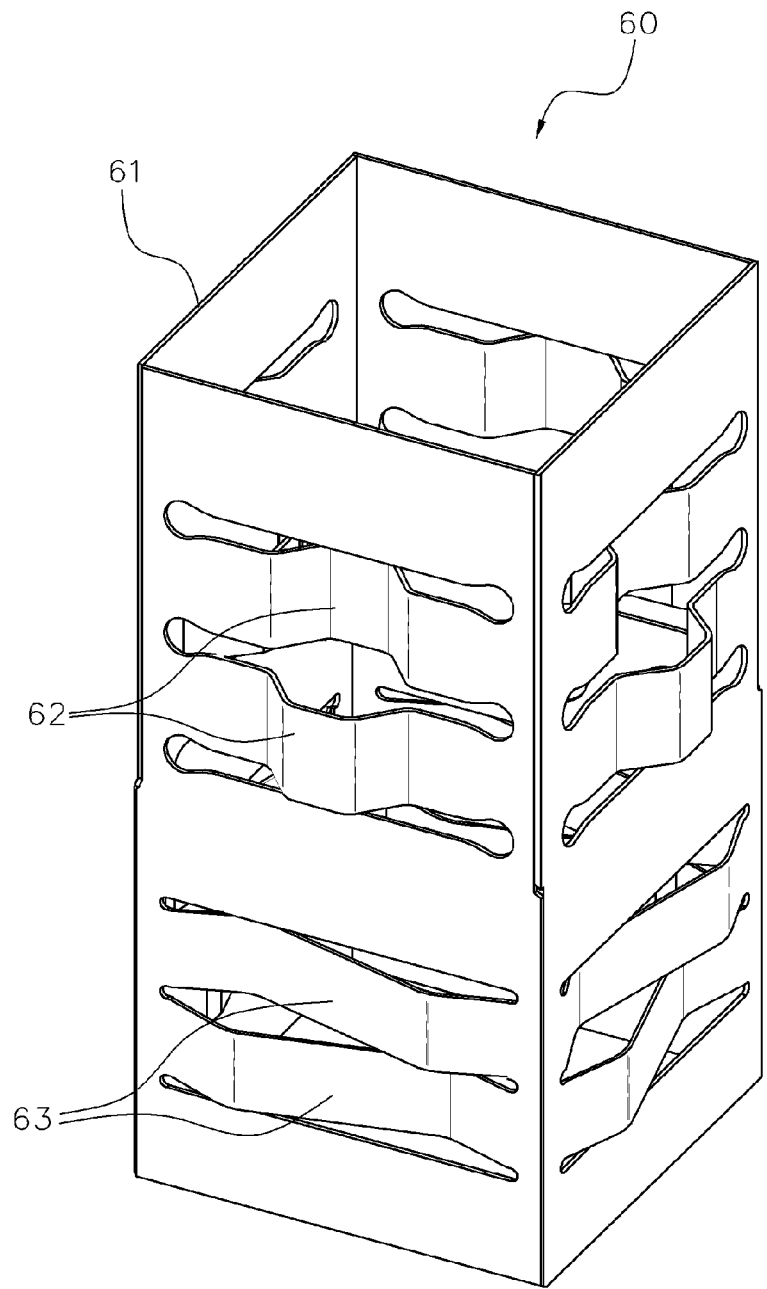
FIG. 3 is a perspective view showing a protective spacer grid, according to a conventional technique.
Figure 4:
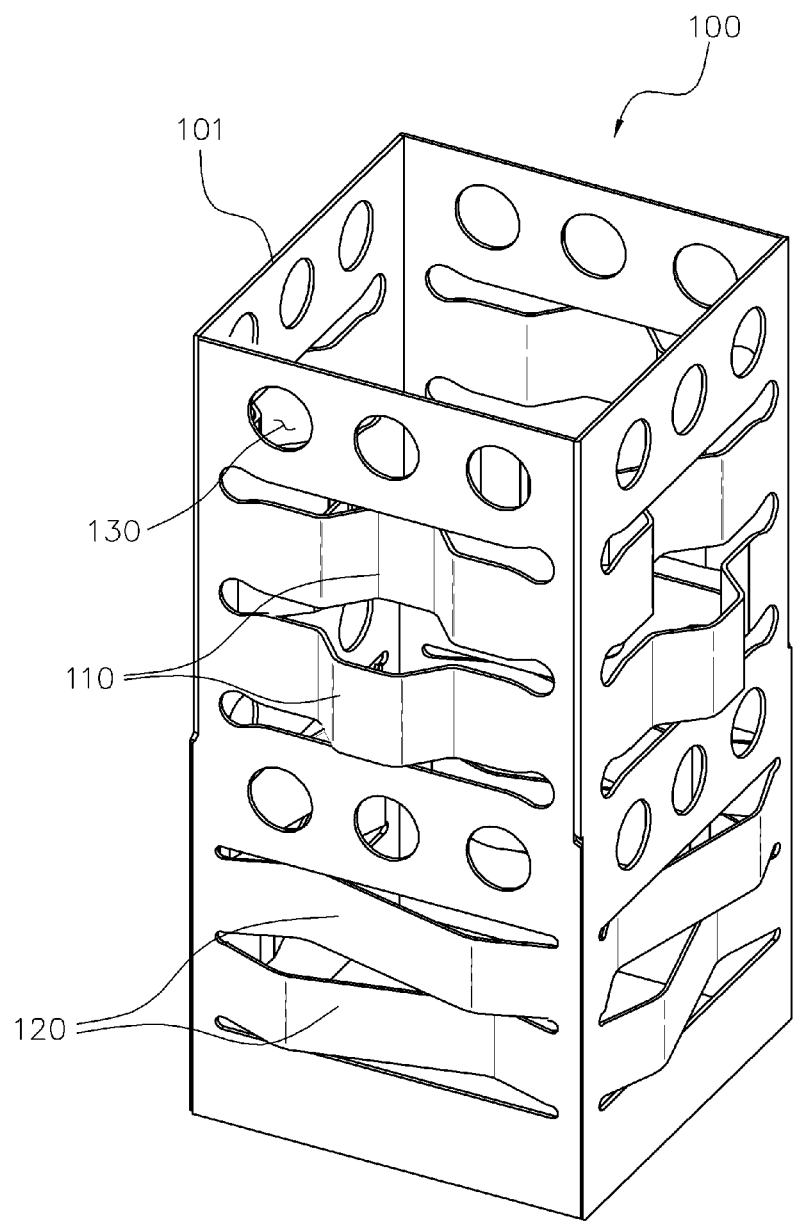
FIG. 4 is a perspective view illustrating a protective spacer grid, according to a preferred embodiment of the present invention.

Referring to FIG. 4, a protective spacer grid 100 according to the present invention is provided under a lower end of a nuclear fuel assembly and includes dimples 110 for supporting a fuel rod in the same manner as that of the conventional technique. The protective spacer grid 100 further includes filtering parts 120 which filter out foreign substances. Although it is not shown in the drawings, a spring for elastically supporting the fuel rod may be provided in the protective spacer grid 100.

Particularly, the protective spacer grid of this embodiment is formed from a plurality of grid strips 101 which form lattice cells, wherein each grid strip 101 has at least one hole 130 which is formed separately from the dimples 110 or the filtering parts 120.

Each of the dimples 110 and the filtering parts 120 is formed by slitting portions of the corresponding grid strip 101 and protruding inwards or outwards a portion defined by the slit so that it has an arc shape. Here, although the slits are formed in the grid strips 101 to form the dimples 110 and the filtering parts 120, the holes 130 must be interpreted as being separately formed in the grid strips 101 regardless of the dimple 110 and the filtering part 120.

As such, because the holes 130 are formed in the grid strips 101 that form the spacer grid, when the coolant is drawn into the fuel assembly, a pressure difference between opposite sides of the holes 130 is reduced, and friction generated between cut edges of the holes 130 and the coolant reduces the magnitude of vibrations and causes a damping effect, thus resulting in a reduction of flow-induced vibrations.

Furthermore, the purpose of the holes 130 formed in the grid strips 101 is to widen the range of the frequency of flow-induced vibration caused by vortex sheddings formed around the edges of the grid strips, thus reducing the possibility of the generation of resonance with the natural frequency of the protective spacer grid.

In the present invention, a variety of modifications of the structure of the holes formed in the grid strips of the spacer grid are possible.

For example, although FIG. 4 illustrates that the holes 130 of the same size are formed in each of the four grid strips 101 of a unit lattice cell at the same positions, the present invention is not limited to this. In other words, holes of different sizes may be formed in each grid strip at different positions.

As another example, a single large hole may be formed in a predetermined portion of each grid strip. However, if the same area is given, forming several small holes is effective at preventing the structural strength of the grid strip from being reduced.

Figure 5A:
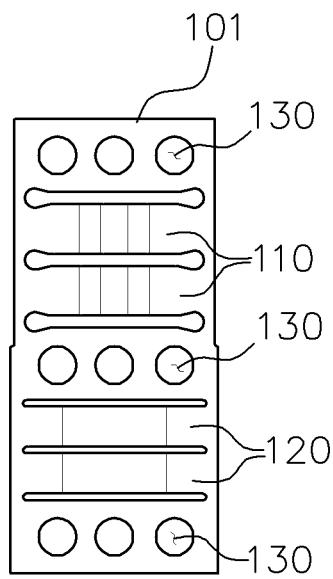
FIGS. 5A and 5B are front views illustrating protective spacer grids, according to other embodiments of the present invention.
Figure 5B:
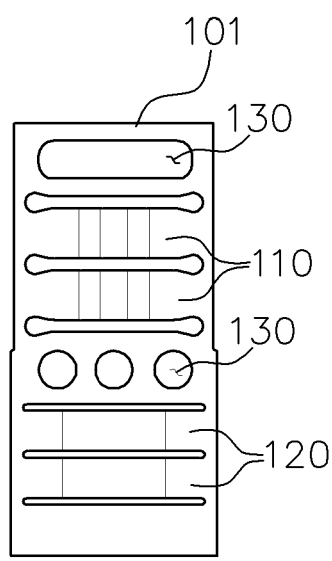

FIGS. 5A and 5B are views showing other embodiments of the protective spacer grid of the nuclear fuel assembly of the present invention. As shown in FIG. 5A, a plurality of holes 130 may be formed in each grid strip above the dimples 110, between the dimples 110 and the filtering parts 120, and below the filtering parts 120. Furthermore, holes 130 may be formed in some of the above-stated portions.

Alternatively, as shown in FIG. 5B, a single large elongated hole 130, rather than a plurality of holes, may be formed.

In the present invention, given the structure of the dimples, the filtering parts or the spring, the positions, sizes or shapes of the holes formed in the grid strip can be modified in a variety of manners, without reducing the structural strength of the grid strip. Within such conditions, it will be preferable that an effective area of holes formed in the grid strip be set to be large.

As described above, in a spacer grid for a nuclear fuel assembly according to the present invention, a dimple and a filtering part are formed by slitting portions of each of grid strips that form lattice cells and by protruding them from the surface of the grid strip. Each grid strip has holes which are formed separately from the dimple or the filtering part. Therefore, when a coolant is drawn into the fuel assembly, the pressure difference between opposite sides of the holes is reduced, and friction generated between cut edges of the holes and the coolant reduces the magnitude of the vibration and causes a damping effect, thus resulting in a reduction of the flow-induced vibration. Furthermore, the holes formed in the grid strip function to widen the range of the frequency of the flow-induced vibration caused by vortex sheddings formed around the edges of the grid strip, thus reducing the possibility of the generation of resonance with the natural frequency of the spacer grid.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A spacer grid provided in a lower end of a nuclear fuel assembly, the spacer grid comprising:
   a plurality of grid strips assembled in a lattice pattern; and
   a plurality of grid cells formed by the plurality of grid strips,
   wherein a section of each of the grid strips, corresponding to each grid cell of the plurality of grid cells, includes
      a first set of holes disposed in a top portion of the section, formed in a planar surface of the section and including two or more holes arranged in a lateral direction perpendicular to a fuel rod, said two or more holes of the first set of holes having a circular shape and a same size with each other and clearly open to an adjacent grid cell,
      a dimple supporting the fuel rod and having slits formed in the lateral direction and arc-shape portions protruding inwards or outwards between the slits, the dimple being disposed below the first set of holes,
      a second set of holes disposed below the dimple and formed in a planar surface of the section, the second set of holes including two or more holes arranged in the lateral direction along the slits of the dimple and clearly open to an adjacent grid cell, said two or more holes of the second set of holes having a circular shape and having a same size with each other, and
      a filtering part disposed below the second set of holes for filtering out foreign substances and having slits formed in the lateral direction and arc-shape portions protruding inwards or outwards between the slits of the filtering part,
   wherein the first set of holes, the dimple, the second set of holes and the filtering part are arranged in this order from the top portion to a bottom portion of the section,
   wherein the first and second set of holes are respectively formed separately from the slits surrounding the dimple and the filtering part, and
   wherein the first and second set of holes cause a damping effect, by reducing a pressure difference between opposite sides of the holes and by generating friction between cut edges of the holes and a coolant, when the coolant is drawn into the fuel assembly.

2. The spacer grid as set forth in claim 1, further comprising a third set of holes disposed below the filtering part and formed in a planar surface of the section, the third set of holes including two or more holes arranged in the lateral direction along the slits of the filtering part and clearly open to an adjacent grid cell, said two or more holes of the third set of holes having a circular shape and having a same size with each other.

* * * * *